(12) United States Patent
Yamaguchi et al.

(10) Patent No.: US 12,108,881 B2
(45) Date of Patent: Oct. 8, 2024

(54) SEAT PAD AND SEAT PAD MANUFACTURING METHOD

(71) Applicant: Archem Inc., Tokyo (JP)

(72) Inventors: Yukiko Yamaguchi, Tokyo (JP); Yoshiyuki Takahashi, Tokyo (JP); Taichi Itabashi, Tokyo (JP)

(73) Assignee: Archem Inc., Tokyo (JP)

( * ) Notice: Subject to any disclaimer, the term of this patent is extended or adjusted under 35 U.S.C. 154(b) by 290 days.

(21) Appl. No.: 17/756,775

(22) PCT Filed: Dec. 8, 2020

(86) PCT No.: PCT/JP2020/045740
§ 371 (c)(1),
(2) Date: Jun. 2, 2022

(87) PCT Pub. No.: WO2021/117744
PCT Pub. Date: Jun. 17, 2021

(65) Prior Publication Data
US 2022/0369828 A1    Nov. 24, 2022

(30) Foreign Application Priority Data
Dec. 13, 2019  (JP) ................ 2019-225322

(51) Int. Cl.
*A47C 27/14* (2006.01)
*B29C 44/14* (2006.01)
(Continued)

(52) U.S. Cl.
CPC .............. *A47C 27/14* (2013.01); *B29C 44/14* (2013.01); *B60N 2/90* (2018.02); *B29K 2075/00* (2013.01);
(Continued)

(58) Field of Classification Search
CPC ........... B29C 44/14; A47C 27/14; B60N 2/56; B60N 2/62; B60N 2/995; B60N 2/90
(Continued)

(56) References Cited

U.S. PATENT DOCUMENTS 10,106,064 B2    10/2018 Kumagai et al.

FOREIGN PATENT DOCUMENTS

| CN | 106163340 A | 11/2016 |
|---|---|---|
| CN | 106455828 A | 2/2017 |

(Continued)

OTHER PUBLICATIONS

May 17, 2022, International Preliminary Report on Patentability issued in the International Patent Application No. PCT/JP2020/045740.
(Continued)

*Primary Examiner* — Milton Nelson, Jr.
(74) *Attorney, Agent, or Firm* — KENJA IP LAW PC

(57) ABSTRACT

A seat pad with improved thermal comfort and improved vibration absorptivity and a seat pad manufacturing method for easily obtaining the seat pad are provided. In the seat pad (1), when a surface portion (2) up to 10 mm from a surface (1f) is cut out and the air permeability AR1 of the surface portion (2) is measured in compliance with JIS K 6400, the air permeability AR1 is more than 5 cc/cm$^2$/sec and 25 cc/cm$^2$/sec or less. The seat pad manufacturing method is a seat pad manufacturing method for obtaining the seat pad (1) by supplying a molding material into a molding die and performing foam molding. As the molding die, a molding die an inner surface of which is covered with polystyrene or polyethylene is used.

7 Claims, 14 Drawing Sheets

(51) Int. Cl.
  *B60N 2/90* (2018.01)
  *B29K 75/00* (2006.01)
  *B29K 623/00* (2006.01)
  *B29K 625/00* (2006.01)
  *B29L 31/00* (2006.01)

(52) U.S. Cl.
  CPC .. *B29K 2623/0633* (2013.01); *B29K 2625/06* (2013.01); *B29L 2031/771* (2013.01)

(58) Field of Classification Search
  USPC .................................................. 297/452.47
  See application file for complete search history.

(56) References Cited

FOREIGN PATENT DOCUMENTS

| JP | 2007050133 A | | 3/2007 |
|----|--------------|---|--------|
| JP | 2009125217 A | | 6/2009 |
| JP | 2009268710 A | | 11/2009 |
| JP | 2010064436 A | * | 3/2010 |
| JP | 4549917 B2 | * | 9/2010 |
| JP | 5393085 B2 | | 1/2014 |
| JP | 2016107815 A | | 6/2016 |
| JP | 2019194321 A | * | 11/2019 |

OTHER PUBLICATIONS

Mar. 16, 2021, International Search Report issued in the International Patent Application No. PCT/JP2020/045740.

Jun. 17, 2024, search result of Office Action issued by the China National Intellectual Property Administration in the corresponding Chinese Patent Application No. 202080085096.X.

* cited by examiner

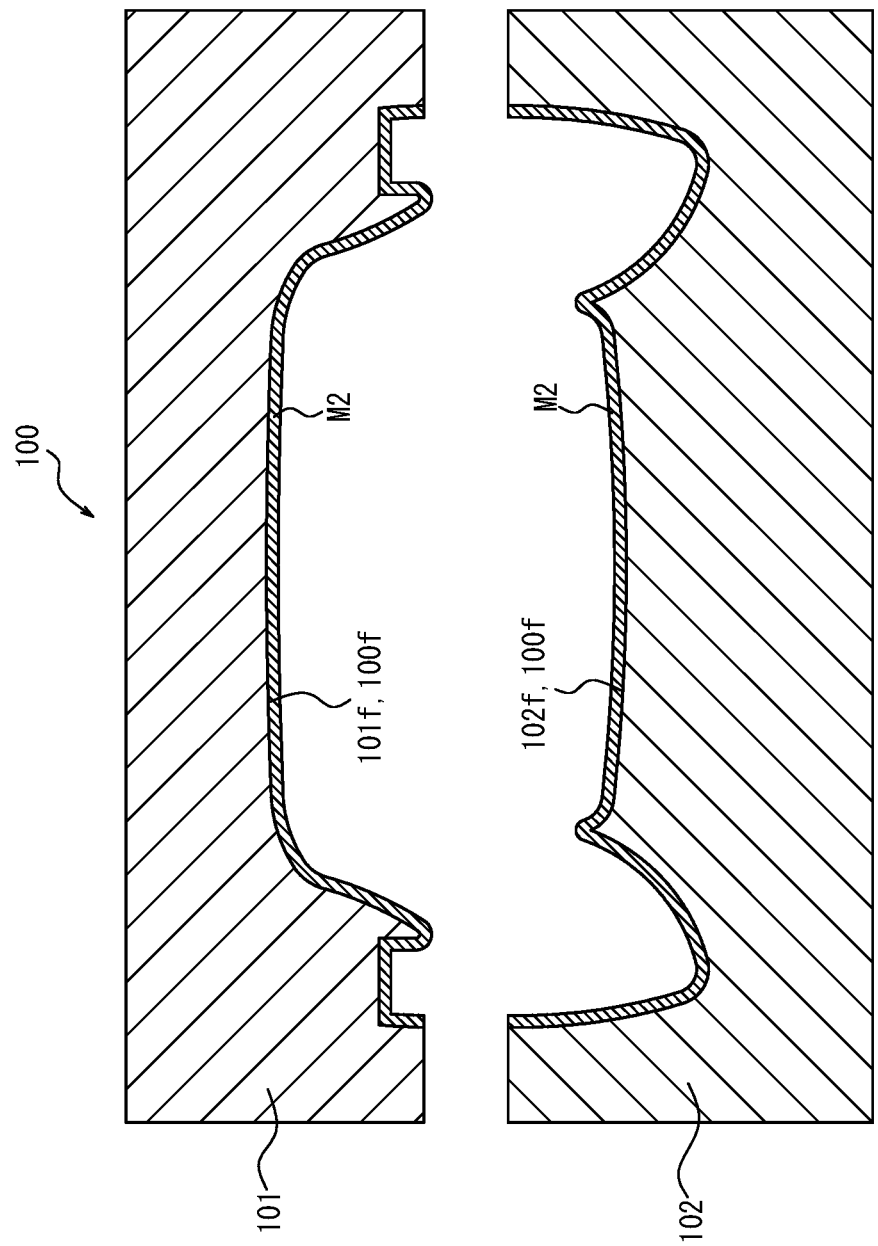

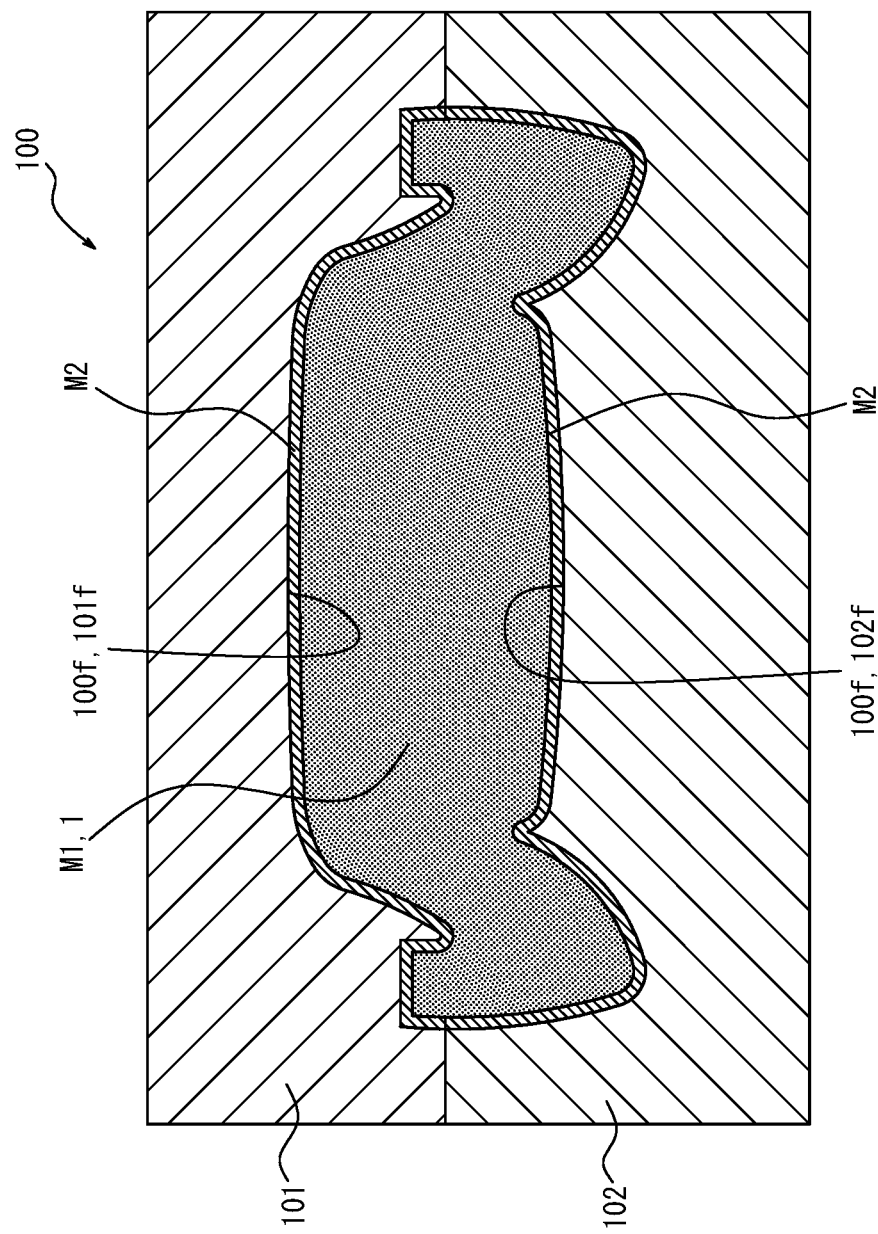

SEAT PAD AND SEAT PAD MANUFACTURING METHOD

TECHNICAL FIELD

The present disclosure relates to a seat pad and a seat pad manufacturing method.

BACKGROUND

There are seat pads in which a part of a surface is a smooth portion with a surface roughness of 2 to 20 μm, and the air permeability of a surface portion of the smooth portion is restrained to a low level (refer to, for example, Patent Literature (PTL) 1). Such seat pads serve to provide sufficiently low vibration transmissibility and excellent vibration absorptivity, owing to the low air permeability of the surface portion.

CITATION LIST

Patent Literature

PTL 1: JP5393085

SUMMARY

Technical Problem

However, there is a concern that the above-described seat pads may become stuffy due to heat buildup when the seat pads are kept seated for a long time. In other words, there is room for improvement with respect to the above-described seat pads in terms of improving thermal comfort while improving the vibration absorptivity.

It would be helpful to provide a seat pad with improved thermal comfort and improved vibration absorptivity, and a seat pad manufacturing method for easily obtaining the seat pad.

Solution to Problem

A seat pad according to the present disclosure includes a surface portion up to 10 mm from a surface, wherein when the surface portion is cut out and the air permeability of the surface portion is measured in compliance with JIS K 6400, the air permeability is more than 5 cc/cm$^2$/sec and 25 cc/cm$^2$/sec or less.

In the seat pad according to the present disclosure, when a core portion inside the surface portion is cut out and the air permeability of the core portion is measured in compliance with JIS K 6400, the air permeability of the core portion is preferably greater than the air permeability of the surface portion.

The seat pad according to the present disclosure may further include a cushion pad,
wherein
a seat portion of the cushion pad may be partitioned into an under-buttocks portion and an under-knees portion,
the air permeability of the surface portion of the under-buttocks portion on a seat side may be within a range stated in claim 1, and
the air permeability of the surface portion of the under-knees portion may be greater than the air permeability of the surface portion of the under-buttocks portion.

The seat pad according to the present disclosure may further include a cushion pad,
wherein the air permeability of an entirety of the surface portion of the cushion pad on a seat side may be limited to within the range stated in claim 1.

In the seat pad according to the present disclosure, the air permeability of the surface portion of an entire surface of the cushion pad may be limited to within the range stated in claim 1.

The seat pad according to the present disclosure may further include a groove configured to partition an air permeability limited portion having the surface portion the air permeability of which is limited to within a range stated in claim 1 from another portion adjacent to the air permeability limited portion,
wherein the surface portion of the air permeability limited portion may include a surface portion of a side face of the groove connected to the air permeability limited portion.

A seat pad manufacturing method according to the present disclosure is a seat pad manufacturing method for obtaining each of the seat pads described above, the seat pad manufacturing method including supplying a molding material into a molding die and performing foam molding,
wherein as the molding die, a molding die the inner surface of which is covered with polystyrene or polyethylene is used.

In the seat pad manufacturing method according to the present disclosure, the molding die is a molding die to obtain a cushion pad, and
as the molding die, a molding die the inner surface of which on a seat side of the cushion pad is locally covered with polystyrene or polyethylene may be used.

In the seat pad manufacturing method according to the present disclosure, the molding die is a molding die to obtain a cushion pad, and
as the molding die, a molding die the entire inner surface of which on a seat side of the cushion pad is covered with polystyrene or polyethylene may be used.

In the seat pad manufacturing method according to the present disclosure, as the molding die, a molding die the entire inner surface of which is covered with polystyrene or polyethylene may be used.

In the seat pad manufacturing method according to the present disclosure,
the molding die may include a protrusion configured to partition an inner surface of the molding die covered with polystyrene or polyethylene, and
a side face of the protrusion may be covered with polystyrene or polyethylene.

In the seat pad manufacturing method according to the present disclosure, as the molding die, a molding die the inner surface of which is covered with high-density polyethylene is preferably used.

In the seat pad manufacturing method according to the present disclosure, as the molding die, a molding die the inner surface of which is covered with polystyrene is preferably used.

In the seat pad manufacturing method according to the present disclosure, as the molding die, a molding die the inner surface of which is covered with low-density polyethylene is preferably used.

Advantageous Effect

According to the present disclosure, it is possible to provide the seat pad with improved thermal comfort and improved vibration absorptivity, and the seat pad manufacturing method for easily obtaining the seat pad.

BRIEF DESCRIPTION OF THE DRAWINGS

In the accompanying drawings:

FIG. 9A is a cross sectional view that schematically illustrates a molding die, before being clamped, that can be used in a seat pad manufacturing method for obtaining the seat pad of FIG. 1;

FIG. 9B is a cross sectional view that schematically illustrates a clamped state of the molding die of FIG. 9A;

DETAILED DESCRIPTION

Seat pads and a seat pad manufacturing method according to embodiments of the present disclosure will be described below with reference to the drawings.

[Seat Pad]

Figure 1:
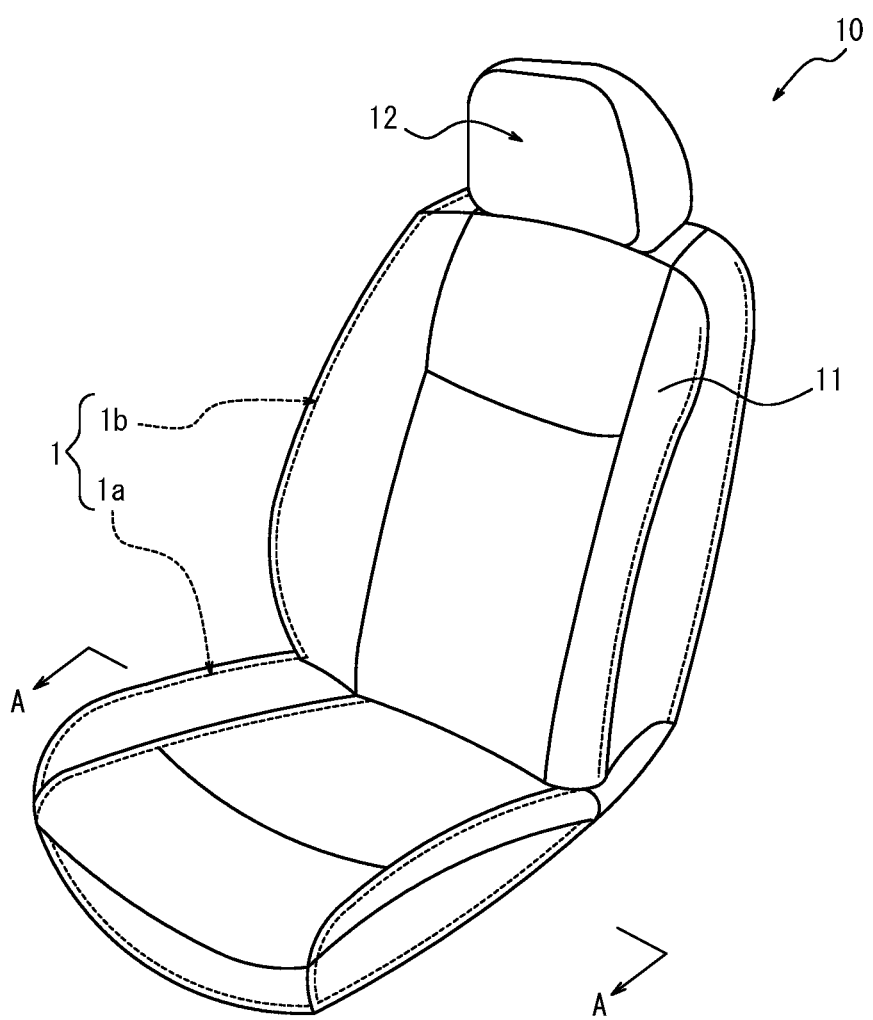
FIG. 1 is a perspective view that schematically illustrates a seat with a seat pad according to a first embodiment of the present disclosure.
Figure 2:
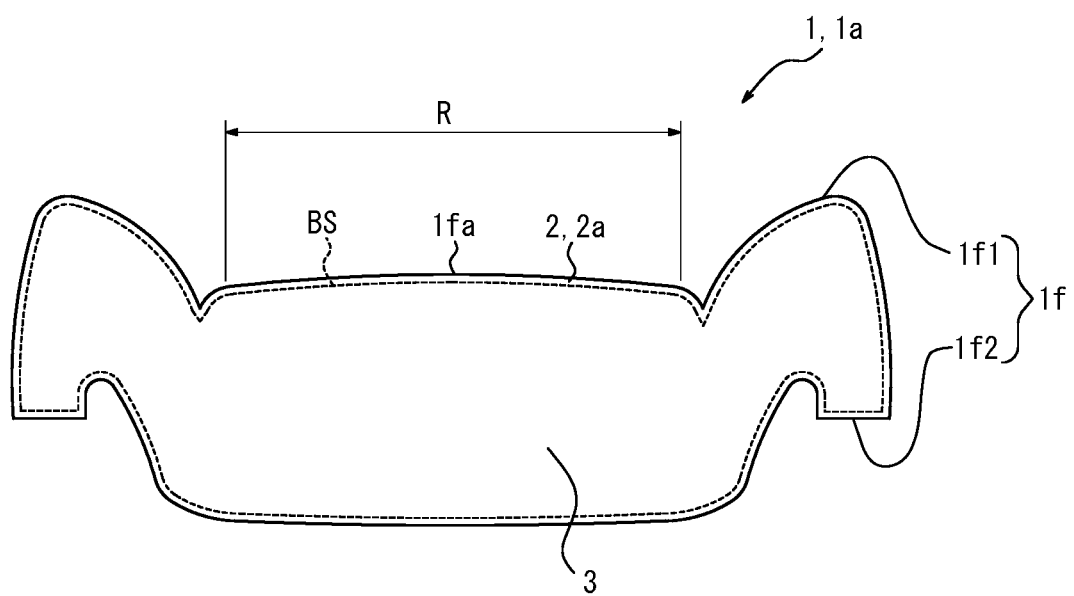
FIG. 2 is a cross sectional view of the seat pad according to the first embodiment, which constitutes a part of the seat of FIG. 1, along the section A-A of FIG. 1.

FIG. 1 is a perspective view that schematically illustrates a seat 10 with a seat pad 1 according to a first embodiment of the present disclosure. FIG. 2 is a cross sectional view of the seat pad 1 according to the first embodiment, which constitutes a part of the seat 10 of FIG. 1, along the section A-A of FIG. 1.

In the example of FIG. 1, the seat 10 is a seat for an automobile. The seat 10 is provided with the seat pad 1 according to this embodiment. In FIG. 1, the seat pad 1 is indicated by dashed lines. The seat pad 1 of this embodiment has a cushion pad 1a for a person to sit on, and a back pad 1b to support the back of the seated person. In this example, the seat 10 further has a surface skin 11 covering a front side of the seat pad 1, a frame (not illustrated) supporting the cushion pad 1a from below, a frame (not illustrated) installed on a back side of the back pad 1b, and a headrest 12 to support the head of the seated person. The surface skin 11 is made of, for example, a material with good air permeability (cloth or the like).

The seat pad 1 is composed of a resin foam. The resin foam is preferably a soft resin foam, and more preferably a soft polyurethane foam. In this embodiment, the cushion pad 1a and the back pad 1b are configured separately from each other. However, the cushion pad 1a and the back pad 1b may be formed integrally.

With reference to FIG. 2, the reference numeral 1f indicates a surface 1f of the seat pad 1. In the seat pad 1 of this embodiment, when a surface portion 2 up to 10 mm from the surface 1f of the seat pad 1 is cut out and the air permeability AR1 of the surface portion 2 (hereinafter also referred to as "surface air permeability AR1") is measured in compliance with JIS K 6400, the surface air permeability AR1 is more than 5 cc/cm$^2$/sec and 25 cc/cm$^2$/sec or less. The surface portion 2 having the surface air permeability AR1 of more than 5 cc/cm$^2$/sec and 25 cc/cm$^2$/sec or less, which is measured in compliance with JIS K 6400, is hereinafter also referred to as "air permeability limited surface portion 2a".

In FIG. 2, the reference numeral BS indicates an interface between the surface portion 2 and a core portion 3, which is inside the surface portion 2. In FIG. 2, the interface BS is indicated by a dashed line. In this embodiment, the surface portion 2 of the seat pad 1 is a surface portion cut out of any surface 1f of the entire surface 1f of the seat pad 1. FIG. 2 illustrates the cushion pad 1a. In this embodiment, the surface 1f of the cushion pad 1a is formed of a surface 1f1 on a seat side (hereinafter also referred to as "seat side surface 1f1") and a surface 1f2 on a back side (hereinafter also referred to as "back side surface 1f2"). In other words, in the cushion pad 1a of this embodiment, even if the surface portion 2 is cut out of any surface 1f of the entire surface 1f of the cushion pad 1a, the surface portion 2 is the air permeability limited surface portion 2a the surface air permeability AR1 of which is more than 5 cc/cm$^2$/sec and 25 cc/cm$^2$/sec or less.

According to the present disclosure, the surface portion 2 may be a surface portion cut out of a particular surface 1f of the seat pad 1, out of the entire surface 1f of the seat pad 1 including the cushion pad 1a and the back pad 1b. However, according to the present disclosure, as illustrated in FIG. 2, it is preferable that the surface portion 2 is at least a surface portion 2 cut out of the seat side surface 1f1 of the cushion pad 1a. It is more preferable that the surface portion 2 is a surface portion cut out of at least a surface 1fa on the side of a seat region R (hereinafter also referred to as "seat region side surface 1fa") of the surface 1f of the cushion pad 1a. Here, the seat region R is a region to which a downward load is applied when the person sits on the seat 10. The seat region R extends in the front and back directions of the drawing (depth direction of the drawing), in addition to the left and right directions of the drawing. In this embodiment, as illustrated in FIG. 2, the seat region side surface 1fa is a smooth surface.

Figure 3:
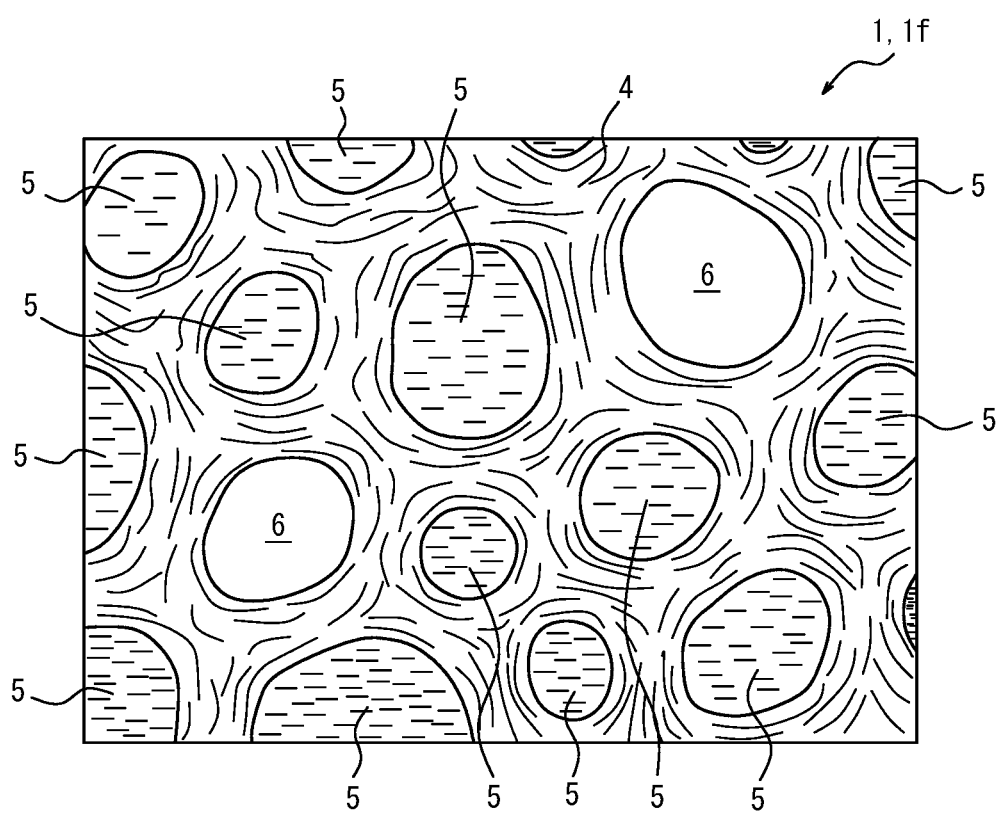
FIG. 3 is a drawing that schematically illustrates a surface of the seat pad of FIG. 2.

FIG. 3 is a drawing that schematically illustrates the surface 1f of the seat pad 1.

With reference to FIG. 3, most of the surface 1f of the seat pad 1 is occupied with closed portions in which the cell membranes 5 are formed on a cell frame 4 without breaking, but there are also opening portions 6 in which no cell membrane 5 is formed on the cell frame 4. With reference to FIG. 3, in this embodiment, the surface 1f of the seat pad 1 has a small percentage of the opening portions 6 compared to the closed portions closed by the cell membranes 5.

In general, when the air permeability of the resin foam is reduced, vibration absorptivity becomes better, and vibration transmissibility becomes lower. However, when the air permeability is reduced, there is a concern that heat buildup causes stuffiness and other problems.

Figure 4:
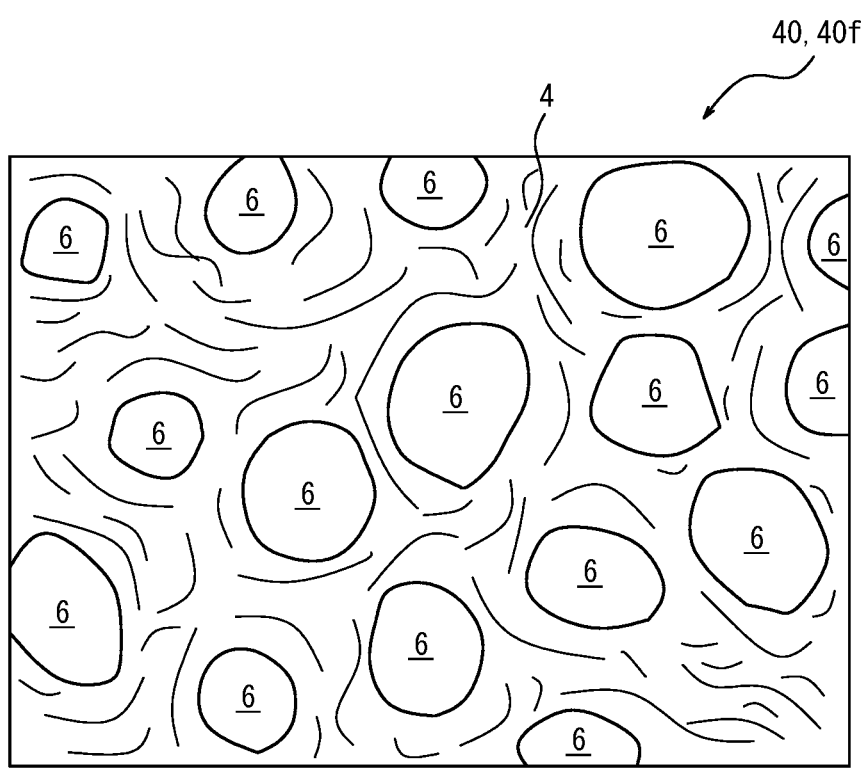
FIG. 4 is a drawing that schematically illustrates a surface of a seat pad of a comparative example.

In contrast, FIG. 4 is a drawing that schematically illustrates a surface 20f of a seat pad 20 of a comparative example. The seat pad 20 is a resin foam obtained by supplying a molding material into a normal molding die and performing foam molding.

With reference to FIG. 4, most of the surface 20f of the seat pad 20 is occupied with opening portions 6 in which cell membranes 5 are not formed. In this case, the air permeability is improved, which eliminates the stuffiness and the like. However, as described above, when the air permeability is improved in a foam molded body, the vibration transmissibility is lowered and the vibration absorptivity is also reduced.

On the other hand, with reference to FIG. 3, in this embodiment, in the surface portion 2, the opening portions 6 are securely formed among the closed portions in which the cell membranes 5 are formed, thereby enabling to have both thermal comfort and vibration absorptivity. In particular, as in this embodiment, when the surface air permeability AR1 satisfies 5 cc/cm²/sec<AR1≤25 cc/cm²/sec, the discomfort of stuffiness and the like due to heat buildup and the discomfort of vibration and the like to be transmitted from the seat pad (seat) can be restrained in good balance, thereby improving thermal comfort and vibration absorptivity.

Also, according to this embodiment, when the core portion 3 inside the surface portion 2 is cut out and the air permeability AR2 of the core portion 3 (hereinafter also referred to as "core air permeability AR2") is measured in compliance with JIS K 6400, it is preferable that the air permeability AR2 is greater than the air permeability AR1 of the surface portion 2. In this case, heat transmitted through the surface portion 2 is efficiently released to the core portion 3, thereby further improving thermal comfort.

According to the present disclosure, the air permeability AR2 of the core portion 3 may be equal to or greater than the surface air permeability AR1. In this case, air-damping effect is increased, which further improves vibration absorptivity.

As described above, according to the present disclosure, the surface portion 2 of the entire surface 1f of the seat pad 1 may be designed as the air permeability limited surface portion 2a, and the surface air permeability AR1 of the entire surface 1f of the seat pad 1 may be limited to within a range of 5 cc/cm²/sec<AR1≤25 cc/cm²/sec. With reference to FIG. 2, in this embodiment, the surface portion 2 of the entire surface 1f of the cushion pad 1a is the air permeability limited surface portion 2a.

On the other hand, in a seat pad, there is a trade-off between air permeability and vibration absorptivity. Therefore, if the air permeability is made comfortable from part to part of the seat pad, the performance of the seat pad as a whole can be further improved.

According to the present disclosure, the surface portion 2 at any position of the surface 1f of the cushion pad 1a may be designed as the air permeability limited surface portion 2a, and the surface air permeability AR1 of the surface 1f of the seat pad 1 may be locally limited to within the range of 5 cc/cm²/sec<AR1≤25 cc/cm²/sec.

Figure 5:
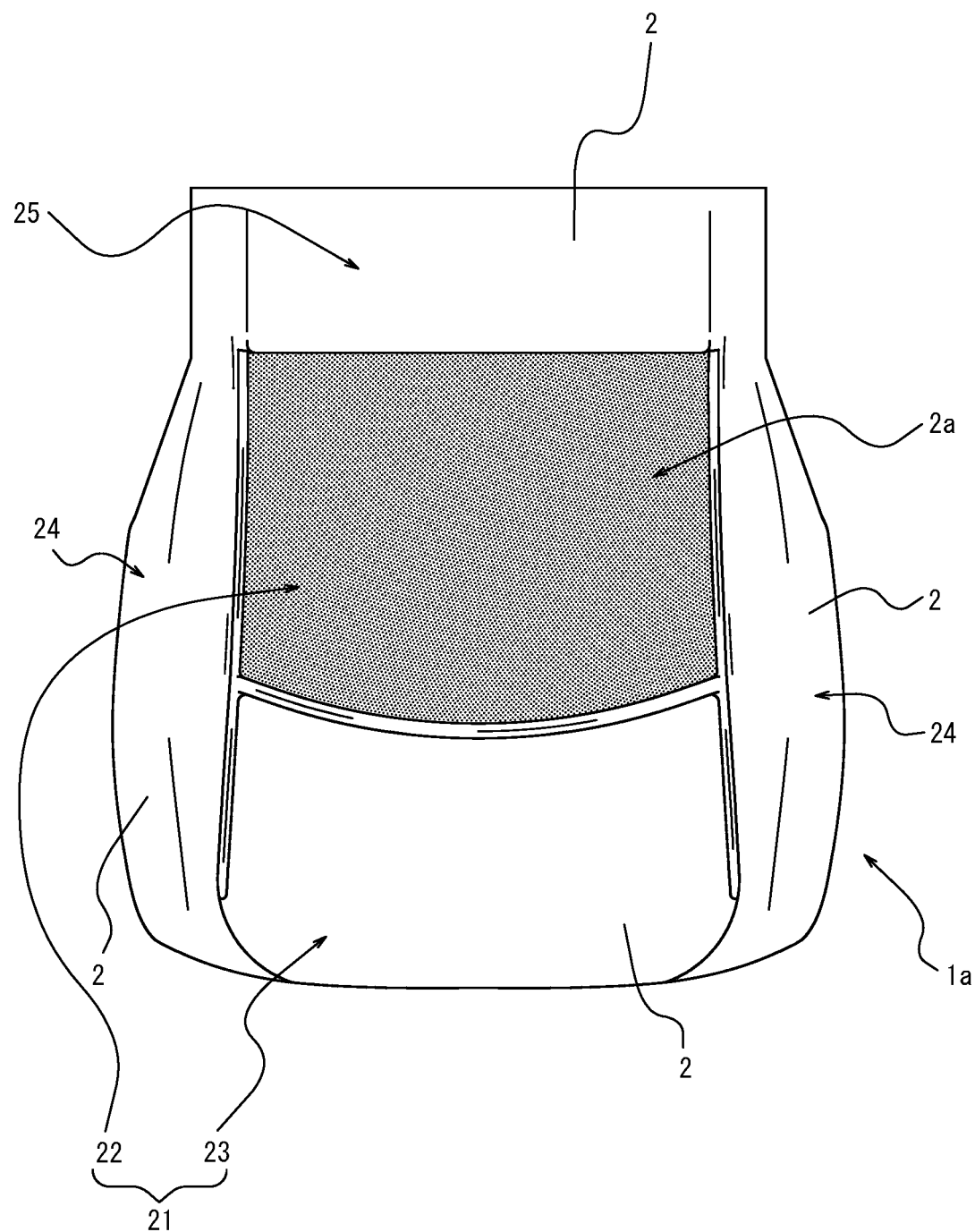
FIG. 5 is a plan view that schematically illustrates a seat pad according to a second embodiment of the present disclosure.

FIG. 5 is a plan view that schematically illustrates a seat pad according to a second embodiment of the present disclosure.

With reference to FIG. 5, in this embodiment, a seat pad 1 includes a cushion pad 1a as in the first embodiment. As illustrated in FIG. 5, in this embodiment, a seat portion 21 of the cushion pad 1a is partitioned into an under-buttocks portion 22 and an under-knees portion 23. In this embodiment, a surface portion 2 of the under-buttocks portion 22 on a seat side is an air permeability limited surface portion 2a that has a surface air permeability AR1 of within a range of 5 cc/cm²/sec<AR1≤25 cc/cm²/sec. Furthermore, in this embodiment, the surface air permeability AR1 of a surface portion 2 of the under-knees portion 23 on a seat side is greater than the surface air permeability AR1 of the surface portion 2 of the under-buttocks portion 22 on the seat side. In this embodiment, the under-buttocks portion 22 is designed to have high vibration absorptivity with emphasis on the vibration absorptivity, while the under-knees portion 23 is designed to have high air permeability with emphasis on the air permeability. Thus, according to the present embodiment, the under-buttocks portion 22 is designed to have high vibration absorptivity with low air permeability, while the under-knees portion 23 is designed to have higher air permeability than the under-buttocks portion 22 while ensuring vibration absorptivity. This allows the functions of the cushion pad 1a to be divided and set on individual parts of the cushion pad 1a.

Figure 6:
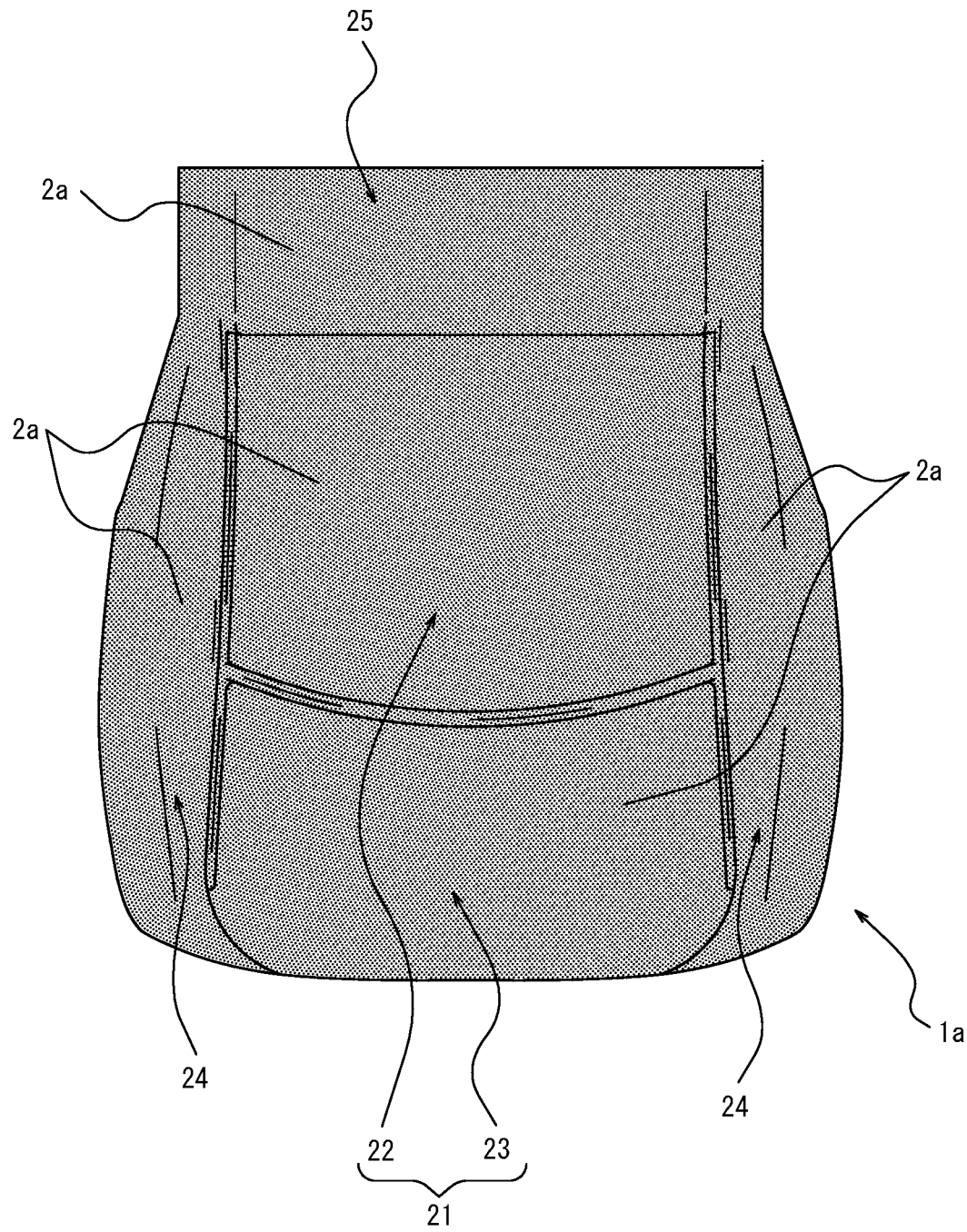
FIG. 6 is a plan view that schematically illustrates a seat pad according to a third embodiment of the present disclosure.

FIG. 6 is a plan view that schematically illustrates a seat pad according to a third embodiment of the present disclosure.

With reference to FIG. 6, in this embodiment, a seat pad 1 includes a cushion pad 1a as in the above embodiments. In this embodiment, the entirety of a surface portion 2 of the cushion pad 1a on a seat side is an air permeability limited surface portion 2a, and the surface air permeability AR1 of the entirety of the surface portion 2 of the cushion pad 1a on the seat side is limited within a range of 5 cc/cm²/sec<AR1≤25 cc/cm²/sec. In the case of this embodiment, the entirety of the cushion pad 1a on the seat side is designed to have high vibration absorptivity with emphasis on the vibration absorptivity. Thus, according to this embodiment, the vibration absorptivity of the entirety of the cushion pad 1a on the seat side can be increased.

In addition, the seat pad of the present disclosure may have a groove 30 that partitions between an air permeability limited portion having a surface portion 2 the surface air permeability AR1 of which is limited within a range of 5 cc/cm²/sec<AR1≤25 cc/cm²/sec and another portion adjacent to the air permeability limited portion, and may include, in the surface portion 2 of the air permeability limited portion, a surface portion of a side face of the groove 30 connected to the air permeability limited portion.

Figure 7:
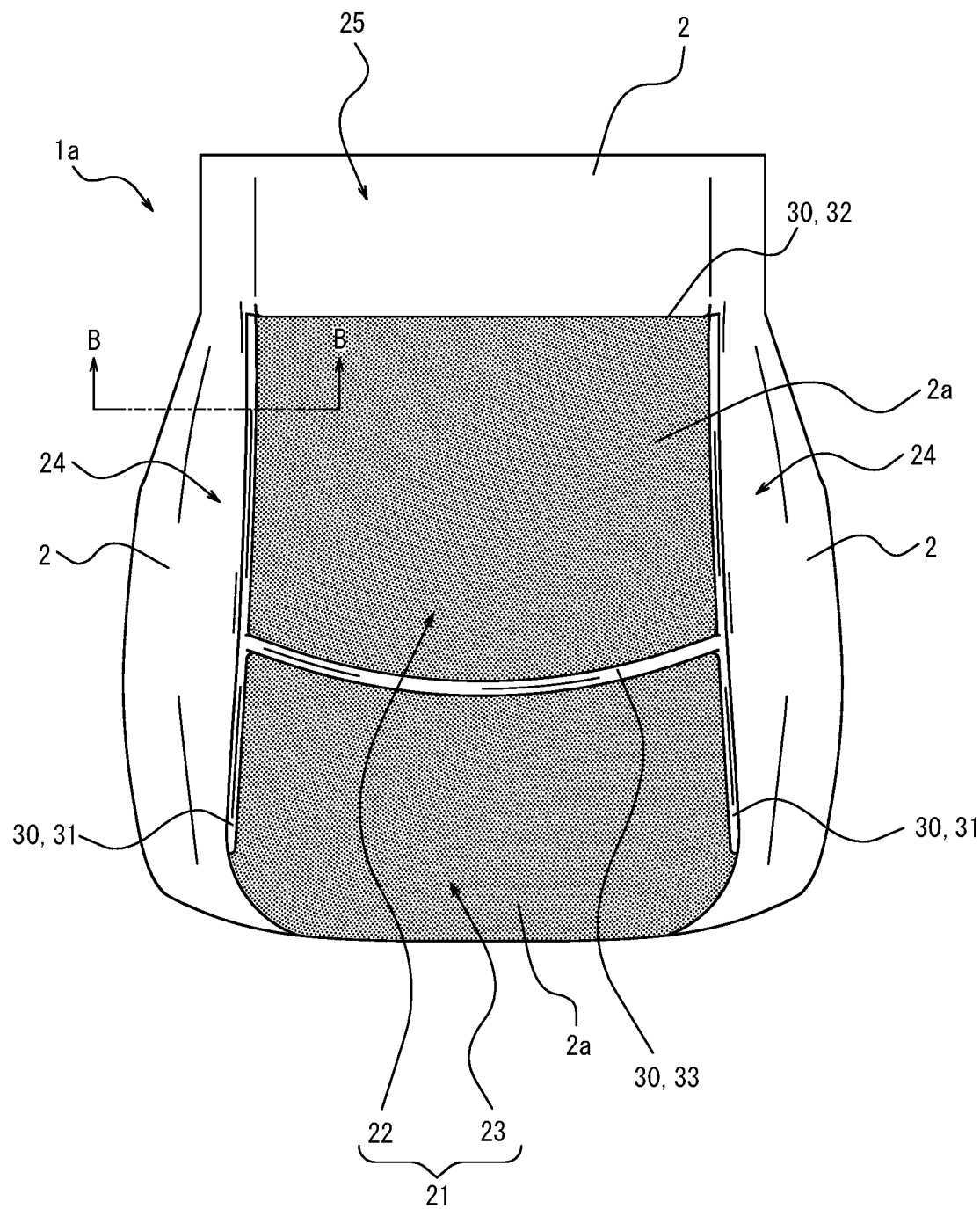
FIG. 7 is a plan view that schematically illustrates a seat pad according to a fourth embodiment of the present disclosure.
Figure 8:
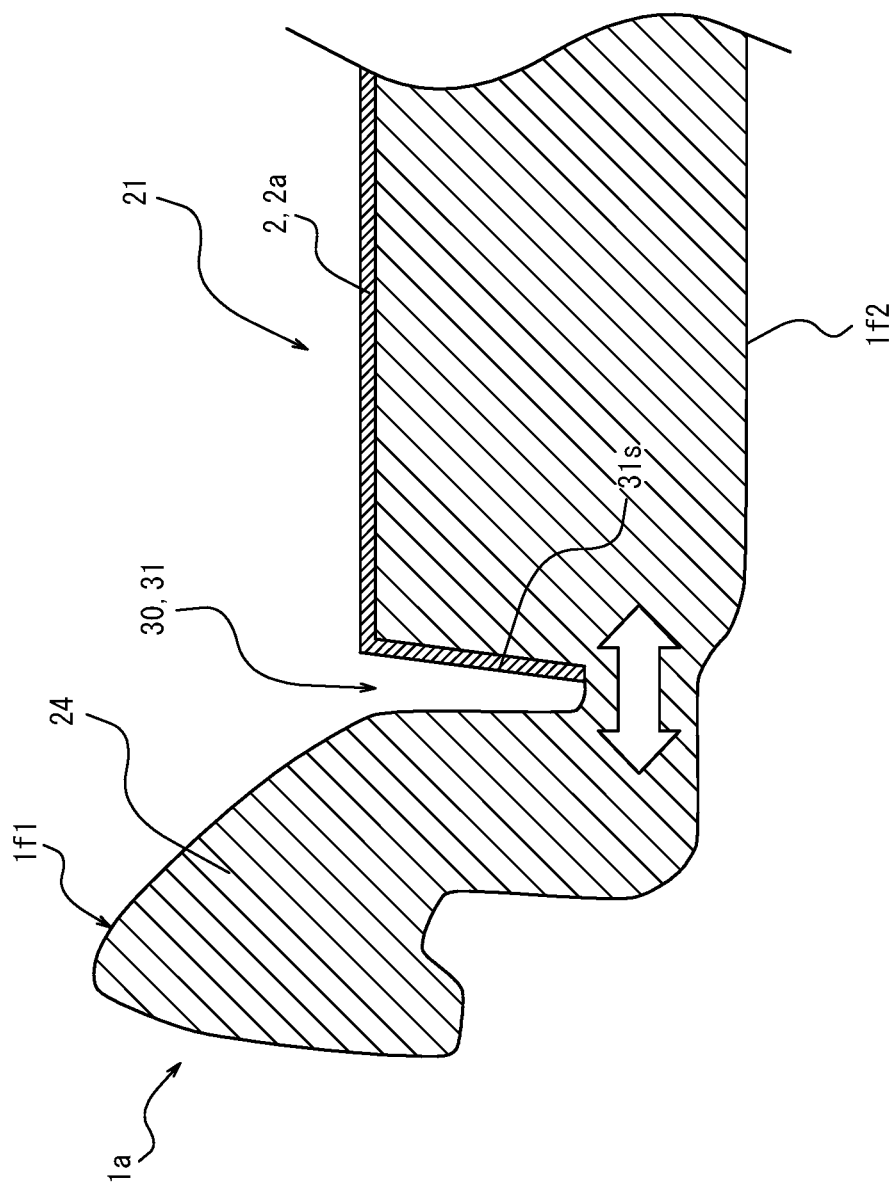
FIG. 8 is a cross sectional view along the section B-B of FIG. 7.

FIG. 7 is a plan view that schematically illustrates a seat pad according to a fourth embodiment of the present disclosure. FIG. 8 is a cross sectional view along the section B-B of FIG. 7.

With reference to FIG. 7, in this embodiment, a seat portion 21 of a cushion pad 1a is partitioned by a groove 30 into an under-buttocks portion 22 and an under-knees portion 23. In this embodiment, the groove 30 includes grooves 31, 32, and 33. Specifically, the grooves 31 partition the seat portion 21 from side pad portions 24. The groove 32 partitions the seat portion 21 from a back pad arrangement portion 25. The groove 33 partitions the under-buttocks portion 22 and the under-knees portion 23. For example, in a case in which a surface portion 2 of the seat portion 21 is designed as an air permeability limited surface portion 2a having a surface air permeability AR1 of within a range of 5 cc/cm²/sec<AR1≤25 cc/cm²/sec, with reference to FIG. 8, in this embodiment, the surface portion 2 of the seat portion 21 includes a surface portion 2 of a side face 31s of the groove 31 connected to the seat portion 21. In this case, an inflow of air into the cushion pad 1a can be more prevented. Therefore, according to this embodiment, air permeability can be restrained and vibration absorptivity can be further increased.

Deepening the groove depth of the groove 30 restrains airflow in the pad between the air permeability limited portion and other portions, thereby improving vibration absorptivity. For example, the groove depth of the groove 30 should be deeper than suspension grooves (grooves for fixing the surface skin 11 of the seat by wires and clips) that partition individual portions. As a specific groove depth, for example, the distance between the surface 1f of the seat pad 1 and the bottom of the groove should be 10 mm or less, and more preferably 5 mm or less. In this embodiment, the groove depths of the grooves 31, 32, and 33 are constant throughout the entire groove 30. Also, in this embodiment, the groove widths of the grooves 31, 32, and 33 are constant throughout the entire groove 30.

In the above second to fourth embodiments, a surface portion 2 of a back side surface 1/2 of the cushion pad 1a may be designed as an air permeability limited surface portion 2a having a surface air permeability AR1 of within a range of 5 cc/cm²/sec<AR1≤25 cc/cm²/sec, as in the first embodiment, but may have an air permeability outside this range.

[Seat Pad Manufacturing Method]

Next, a seat pad manufacturing method according to an embodiment will be described with reference to the drawings.

The seat pad manufacturing method according to the embodiment of the present disclosure is a seat pad manufacturing method for obtaining the seat pad 1 by supplying a molding material M1 into a molding die 100 and performing foam molding.

FIG. 9A is a cross sectional view that schematically illustrates the molding die 100, before being clamped, that can be used in the seat pad manufacturing method according to the embodiment of the present disclosure. FIG. 9B is a cross sectional view that schematically illustrates a clamped state of the molding die 100 of FIG. 9A.

With reference to FIG. 9B, the reference numeral 100 indicates the molding die that can be used in the manufacturing method of the seat pad 1. In this embodiment, the molding die 100 is a die to obtain the cushion pad 1a, out of a molding die to obtain the seat pad 1. An inner surface 100f of the molding die 100 forms a cavity into which a molding material M1 is supplied and in which foam molding is performed. The inner surface 100f of the molding die 100 is covered with resin M2. In this embodiment, as the molding die 100, a molding die the entire inner surface 100f of which is covered with the resin M2 is used. As the resin M2, PS (polystyrene) or PE (polyethylene) can be used. Furthermore, as PE, HDPE (high-density polyethylene) or LDPE (low-density polyethylene) can be used. In this embodiment, HDPE is used as the resin M2.

Also, with reference to FIG. 9A, in this example, the molding die 100 includes an upper die 101 and a lower die 102. The inner surface 100f of the molding die 100 is formed of an inner surface 101f of the upper die 101 and an inner surface 101f of the lower die 102. In this example, the resin M2 is formed of a resin sheet. In this embodiment, the upper die 101 forms the back side surface 1/2 of the cushion pad 1a. Also in this embodiment, the lower die 102 forms the seat side surface 1/1 of the cushion pad 1a.

The seat pad manufacturing method according to the embodiment of the present disclosure can be outlined as follows.

[Molding Die Placing Step]

First, as illustrated in FIG. 9A, the inner surface 101f of the upper die 101 and the inner surface 101f of the lower die 102 are each covered with the resin M2. In this embodiment, the inner surface 101f of the upper die 101 and the inner surface 101f of the lower die 102 are each covered with a resin sheet made of the resin M2. Then, as illustrated in FIG. 9B, the upper die 101 and lower die 102 are combined to form the cavity covered with the resin M2, inside the molding die 100.

[Foam Molding Step]

Next, as illustrated in FIG. 9B, the molding material M1 is injected into the molding die 100 covered with the resin M2, and the molding material M1 is heated and foamed. Thereafter, the molding die 100 is clamped and foam molding is performed inside the molding die 100. The molding material M1 is foam resin. The foam resin is preferably soft polyurethane. The molding material M1 is, for example, soft foamed polyurethane in which a foaming agent is mixed with soft polyurethane resin. However, according to the present disclosure, various types of foam resin can be used as the molding material M1.

[Die Opening Step]

After the foam molding inside the molding die 100 is completed, the molding die 100 is opened and separated into the upper die 101 and the lower die 102. Thereby, the seat pad 1 the surface 1f of which has a remaining percentage of the cell membranes of 92% or more can be obtained.

In this way, when the molding die 100 the inner surface 100f of which is covered with the resin M2 is used as the molding die 100, the seat pad 1 can be easily obtained by a simple procedure of just covering the inner surface 100f of the molding die 100 with the resin M2.

As described above, in the manufacturing method according to this embodiment, the molding die 100 the entire inner surface 100f of which is covered with the resin M2 is used.

On the other hand, according to the manufacturing method of the present disclosure, as the molding die 100, a molding die the inner surface of which on a seat side of the cushion pad 1a is locally covered with the resin M2 may be used.

Figure 10:
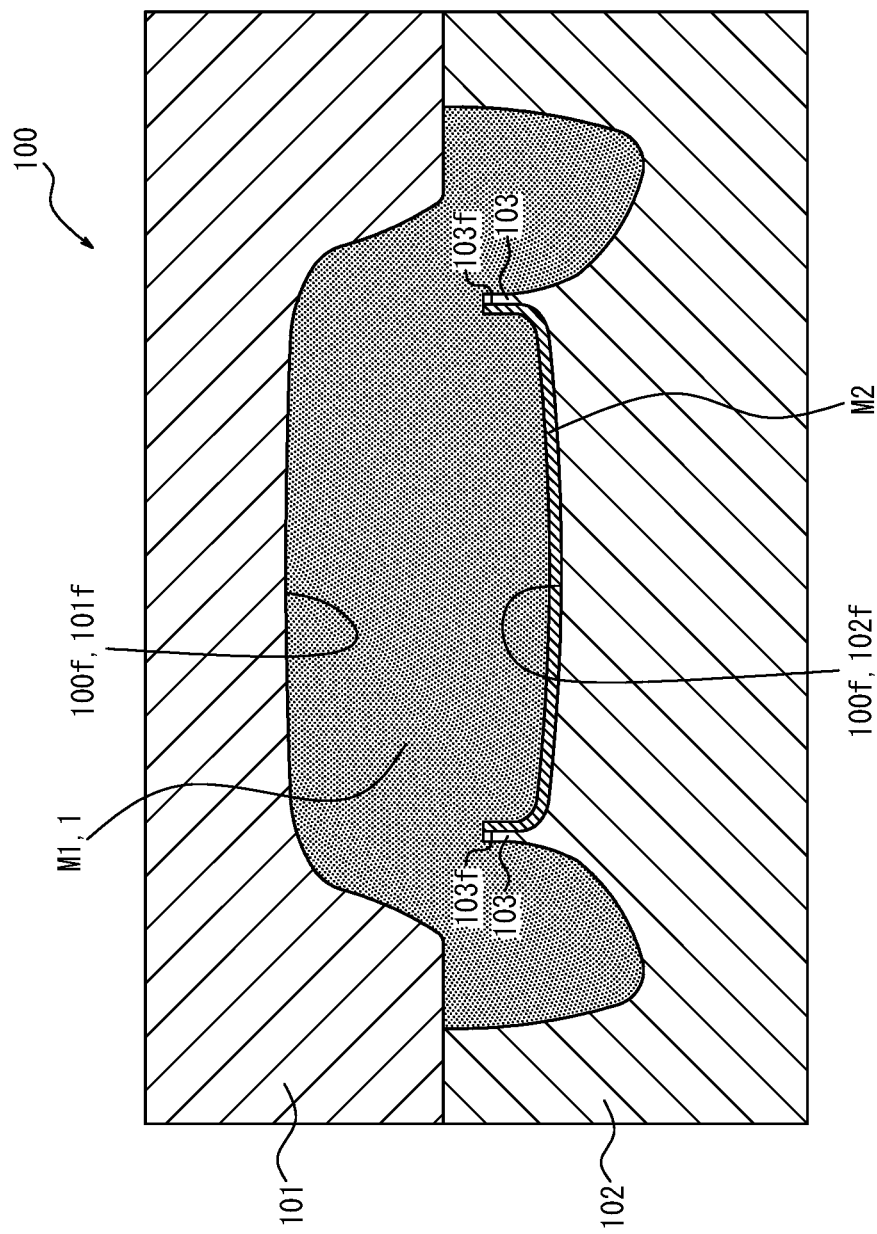
FIG. 10 is a cross sectional view that schematically illustrates a clamped state of a molding die that can be used in the seat pad manufacturing method for obtaining the seat pad of FIG. 7.

FIG. 10 is a cross sectional view that schematically illustrates a clamped state of a molding die 100 that can be used in a manufacturing method for obtaining the cushion pad 1a of FIG. 7.

As described above, in this embodiment, the molding die 100 is a molding die to obtain the cushion pad 1a. As illustrated in FIG. 10, an inner surface of the molding die 100 on the seat side of the cushion pad 1a is locally covered with the resin M2. By using such a molding die 100, for example, the cushion pad 1a formed with the groove 30, as illustrated in FIG. 7, can be obtained.

In particular, as illustrated in FIG. 10, the molding die 100 has protrusions 103 that partition an inner surface 100f of the molding die 100 covered with the resin M2. In this embodiment, the resin M2 covers side faces 103f of the protrusions 103. The side faces 103f of the protrusions 103 are connected to the inner surface 100f of the molding die 100 that is covered with resin M2. Thereby, the cushion pad 1a partitioned by the groove 30, as illustrated in FIGS. 7 and 8, can be obtained. In addition, changing the arrangement of the resin M2 in the molding die 100 of FIG. 10 allows to obtain the cushion pad 1a as illustrated in FIG. 5, for example.

Figure 11:
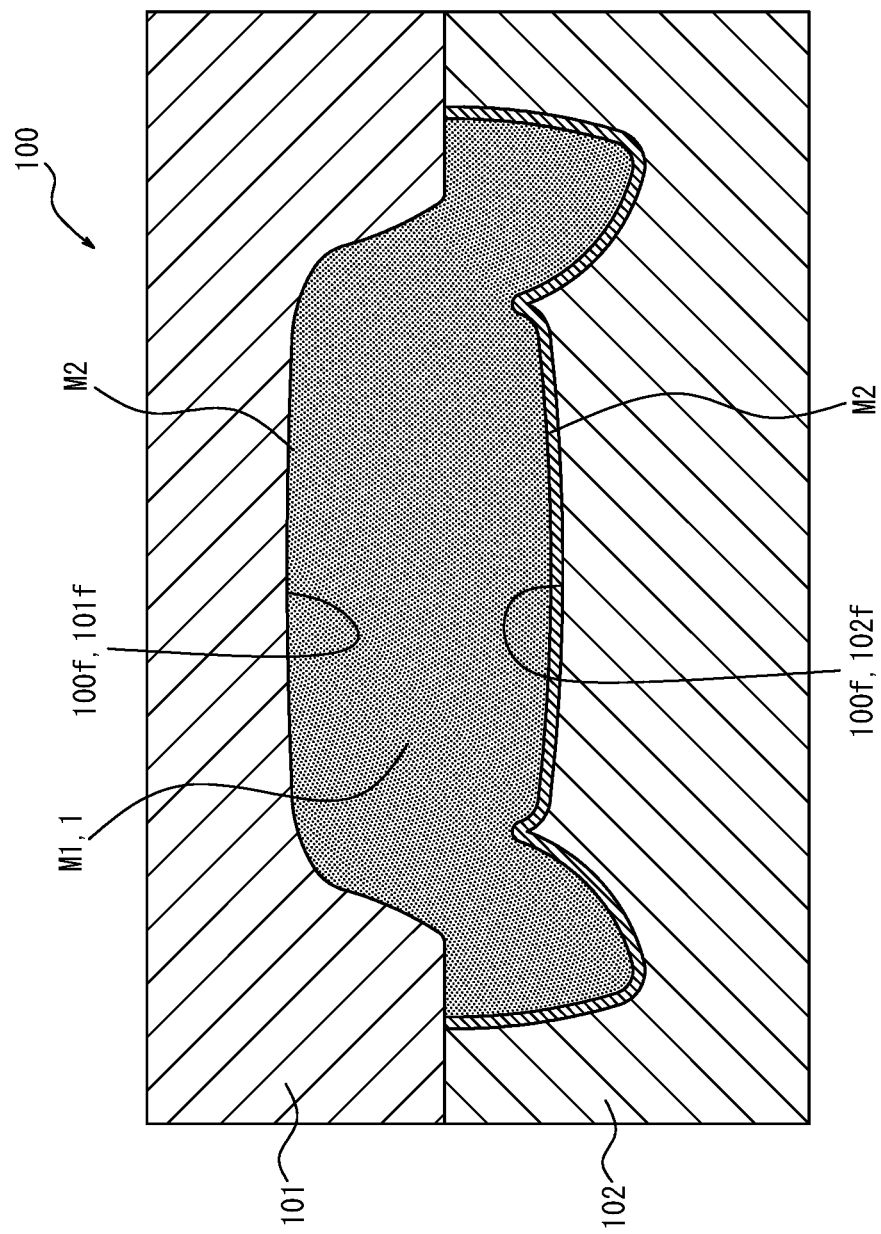
FIG. 11 is a cross sectional view that schematically illustrates a clamped state of a molding die that can be used in the seat pad manufacturing method for obtaining the seat pad of FIG. 6.

FIG. 11 is a cross sectional view that schematically illustrates a clamped state of a molding die that can be used in a seat pad manufacturing method for obtaining the seat pad of FIG. 6.

As described above, in this embodiment, a molding die 100 is a molding die to obtain the cushion pad 1a. As illustrated in FIG. 11, an inner surface of the molding die 100 on a seat side of the cushion pad 1a is locally covered with the resin M2. In this embodiment, the inner surface of the molding die 100 is covered with the resin M2 at the entire portion corresponding to the seat side of the cushion pad 1a. Using such a molding die 100 allows to obtain the cushion pad 1a as illustrated in FIG. 6, for example.

[Test Results]

Next, the following are test results for seat pads obtained by using different types of resin M2, as the resin M2 that covers the inner surface 100f of the molding die 100.

Figure 12:
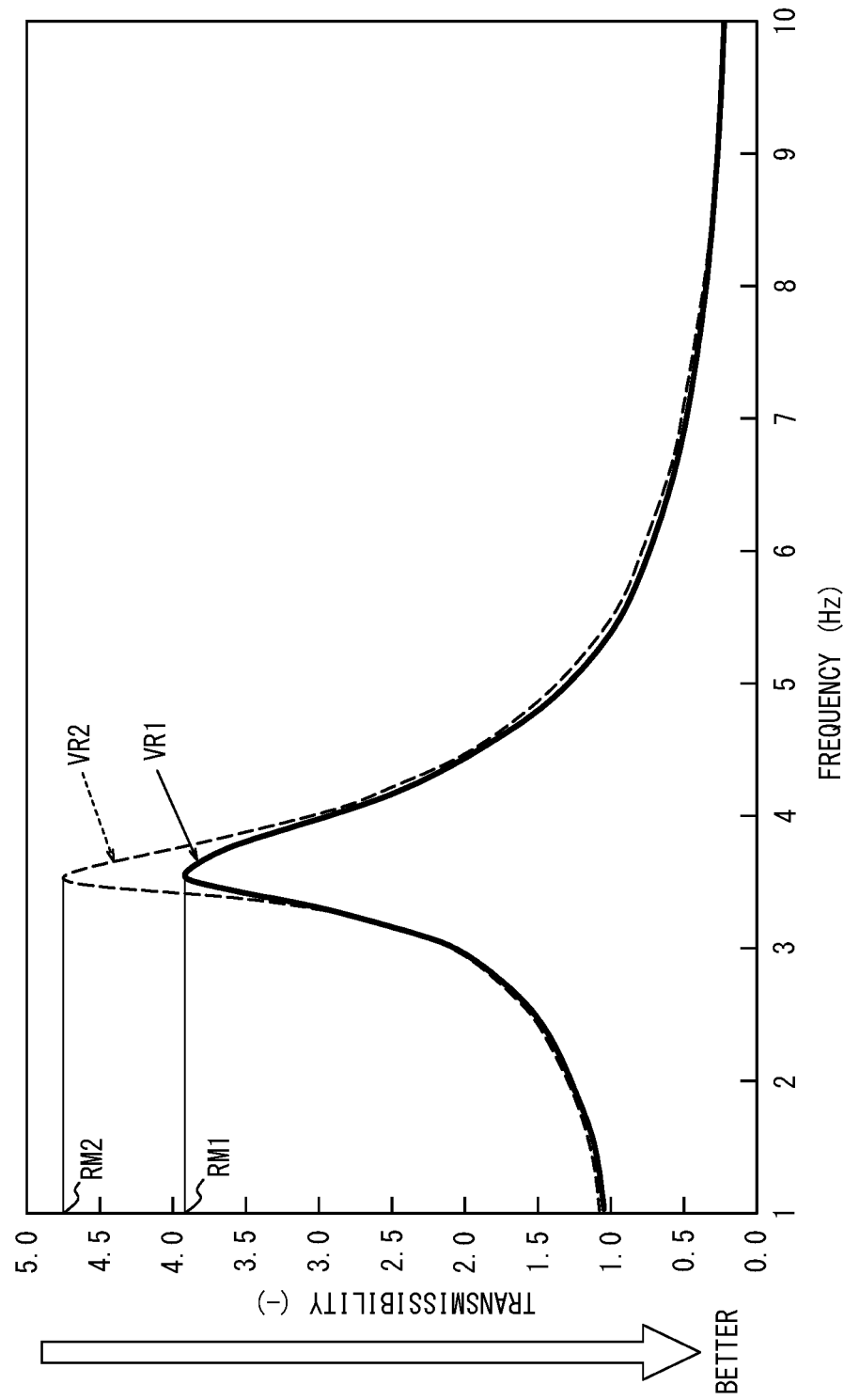
FIG. 12 is a graph that illustrates, in comparison, the vibration transmissibility of the seat pad according to the present disclosure and the vibration transmissibility of the seat pad according to the comparative example.

FIG. 12 is a graph that illustrates the vibration transmissibility VR1 of the seat pad 1 according to this embodiment and the vibration transmissibility VR2 of the seat pad 20 as Comparative Example 1.

In FIG. 12, the reference numeral VR1 indicates the vibration transmissibility of the seat pad 1 according to this embodiment, measured in compliance with the JASO B-407 standards. The reference numeral VR2 indicates the vibration transmissibility of the seat pad 20 according to Comparative Example 1, which is also measured in compliance with the JASO B-407 standards.

In FIG. 12, the test result of the vibration transmissibility VR1 obtained using the seat pad 1 is indicated with a solid line, and the test result of the vibration transmissibility VR2 obtained using the seat pad 20 is indicated with a dashed line.

FIG. 12 indicates that the resonance magnification RM1 of the seat pad 1 (the peak value of the vibration transmissibility VR1 of the seat pad 1) is lower than the resonance magnification RM2 of the seat pad 20 (the peak value of the vibration transmissibility VR2 of the seat pad 20). Therefore, it is found from FIG. 12 that the seat pad 1 of this embodiment has better vibration absorptivity than the seat pad 20 of Comparative Example 1.

Figure 13:
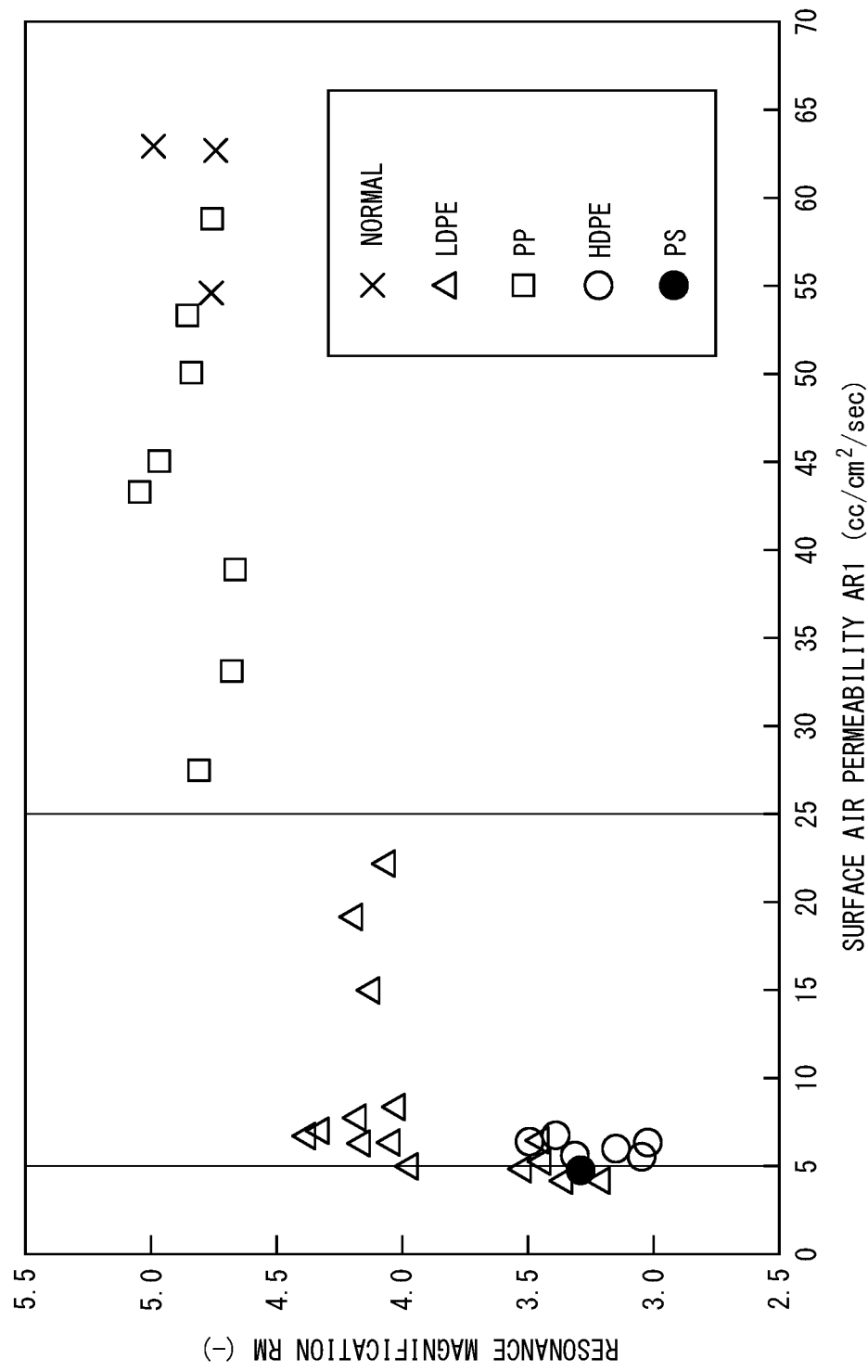
FIG. 13 is a graph illustrating the relationship between the surface air permeability and the resonance magnification of seat pads.

Next, FIG. 13 is a graph illustrating the relationship between the surface air permeability AR1 of each seat pad and the resonance magnification RM of the seat pad.

FIG. 13 illustrates the relationship between the surface air permeability AR1 and the resonance magnification RM of each of the seat pads obtained by the molding die 100 covered with the different types of resin M2.

It is found from FIG. 13 that as the surface air permeability AR1 of the seat pad decreases, the resonance magnification RM tends to decrease too. In particular, FIG. 13 indicates that the resonance magnification RM is sharply restrained at a surface air permeability AR1 of the seat pad of 25 cc/cm$^2$/sec. Therefore, it is found from FIG. 13 that the seat pads with AR1≤25 cc/cm$^2$/sec, as with the seat pad 1 of this embodiment, can have effectively improved vibration absorptivity while maintaining air permeability.

In more detail, in the case of 25 cc/cm$^2$/sec<AR1, the resonance magnification RM exceeds 4.5. This test result is consistent with the test results of two types of seat pads, i.e. the seat pad 20 as Comparative Example 1 in which foam molding was performed without covering the inner surface 100f of the molding die 100 with the resin M2, and the seat pad in which foam molding was performed with covering the inner surface 100f of the molding die 100 with PP (polypropylene) as the resin M2.

In contrast, in the case of AR1≤25 cc/cm$^2$/sec, the resonance magnification RM is less than 4.5. This test result corresponds to the test results of three types of seat pads, i.e. the seat pad 1 (hereinafter also referred to as "HDPE molded seat pad 1") according to this embodiment in which foam molding was performed with covering the inner surface 100f of the molding die 100 with HDPE (high-density polyethylene) as the resin M2, the seat pad 1 (hereinafter also referred to as "LDPE molded seat pad 1") according to this embodiment in which foam molding was performed with covering the inner surface 100f of the molding die 100 with LDPE (low-density polyethylene) as the resin M2, and the seat pad 1 (hereinafter also referred to as "PS molded seat pad 1") according to this embodiment in which foam molding was performed with covering the inner surface 100f of the molding die 100 with PS (polystyrene) as the resin M2.

Also, it is found from FIG. 13 that, according to the above three types of seat pads 1, when the surface air permeability AR of each seat pad is in the vicinity of AR1<5 cc/cm$^2$/sec, the resonance magnification RM tends to be sharply restrained, while the surface air permeability AR1 of the seat pad is maintained.

In more detail, according to the two types of seat pads, i.e. the HDPE molded seat pad 1 according to this embodiment and the PS molded seat pad 1 according to another embodiment of the present disclosure, the resonance magnification RM is restrained at 3.0 to 3.5, in the vicinity of AR1=5 cc/cm$^2$/sec. Also, in the LDPE molded seat pad 1 according to this embodiment, the resonance magnification VR is sometimes restrained at 3.0 to 3.5, in the vicinity of AR1=5 cc/cm$^2$/sec. In particular, in the case of the HDPE molded seat pad 1 according to this embodiment, the resonance magnification RM is restrained most at around 3.0.

As is apparent from the above test results, the seat pad manufacturing method according to the present disclosure preferably uses the molding die 100 in which the inner surface 100f of the molding die 100 is covered with high-density polyethylene. In this case, the resonance magnification RM of the seat pad 1 can be most effectively reduced. Therefore, in this case, the vibration absorptivity is further improved.

In addition, as is apparent from the above test results, the seat pad manufacturing method according to the present disclosure preferably uses, as the molding die 100, a molding die 100 the inner surface 100f of which is covered with polystyrene. Also in this case, the resonant magnification RM of the seat pad can be reduced effectively, as in the case of using the molding die 100 the inner surface 100f of which is covered with high-density polyethylene. Therefore, in this case, the vibration absorptivity is further improved. In particular, when a molding die covered with HDPE is used, the resonance magnification RM is further reduced, in other words, the vibration absorptivity is further improved.

In addition, as is apparent from the above test results, the seat pad manufacturing method according to the present disclosure preferably uses, as the molding die 100, a molding die 100 the inner surface 100f of which is covered with low-density polyethylene. Also in this case, the vibration absorptivity is further improved.

The following table indicates the resonance frequency, resonance magnification, and surface air permeability of each of the seat pads obtained by foam molding using the molding die 100 the inner surface 100f of which is covered with the resin M2, together with a remaining membrane ratio (%). PP-1 and PP-2 each represent polypropylene. Normal indicates a case in which foam molding is performed without covering the inner surface 10f of the molding die 100 with the resin M2. In other words, Normal indicates the seat pad 20 of Comparative Example 1. The remaining membrane ratio (%) is, in the surface 1f of the seat pad 1, the remaining ratio of the cell membrane 5 to a predetermined area of the surface 1f. Here, the predetermined area is a square area of 80 mm in length×80 mm in width.

TABLE 1

| Film Material | Remaining membrane ratio (%) | Resonance magnification (−) | Surface air permeability (cc/cm$^2$/sec) |
| --- | --- | --- | --- |
| PS | 98.6 | 3.30 | 4.6 |
| HDPE | 97.7 | 3.05 | 5.4 |
| LDPE | 97.4 | 4.06 | 22.0 |
| PP | 88.5 | 4.82 | 27.4 |
| Normal | 91.5 | 4.77 | 54.5 |

With reference to Table 1 above, it is found that, in the manufacturing method of the seat pad 1, when high-density polyethylene is used as the resin M2 to cover the inner surface 100f of the molding die 100, the remaining ratio of the cell membrane is 97.5% or more and the surface air permeability AR1 satisfies 5 cc/cm$^2$/sec<AR1≤25 cc/cm$^2$/sec. It can also be found that the surface air permeability AR1 is restrained, as compared to the case of using polypropylene or low-density polyethylene as the resin M2 to cover the inner surface 100f of the molding die 100. In other words, when high-density polyethylene is used as the resin M2 to cover the inner surface 100f of the molding die 100, air-damping effect, i.e. vibration absorptivity becomes the best.

Also, with reference to Table 1 above, it is found that, in the manufacturing method of the seat pad 1, when polystyrene is used as the resin M2 to cover the inner surface 100f of the molding die 100, the remaining ratio of the cell membrane is 97.5% or more, as in the case of using high-density polyethylene, and the surface air permeability AR1 satisfies 5 cc/cm$^2$/sec<AR1≤25 cc/cm$^2$/sec. Therefore, in this case too, vibration absorptivity becomes the best.

Also, with reference to Table 1 above, it is found that, in the manufacturing method of the seat pad 1, when low-density polyethylene is used as the resin M2 to cover the inner surface 100f of the molding die 100, the remaining ratio of the cell membrane is 95% or more and the surface air permeability AR1 satisfies 5 cc/cm$^2$/sec<AR1≤25 cc/cm$^2$/sec. It can also be found that the surface air permeability AR1 is restrained, as compared to the case of using polypropylene as the resin M2 to cover the inner surface 100f of the molding die 100. In other words, the use of low-density polyethylene, as the resin M2 to cover the inner surface 100f of the molding die 100, results in better air-damping effect, i.e. better vibration absorptivity than the use of polypropylene.

The above describes exemplary embodiments of the present disclosure, and various modifications can be made without departing from the scope of the claims. In addition, the various configurations employed in each of the above-described embodiments can be mutually replaced as appropriate.

REFERENCE SIGNS LIST

1 Seat pad
2 Surface portion
2a Air permeability limited surface portion
3 Core portion
1f Surface of seat pad (surface)
4 Cell frame
5 Cell membrane
6 Opening portion
100 Molding die
100f Inner surface of molding die
101 Upper die
101f Inner surface of upper die
102 Lower die
102f Inner surface of lower die
M1 Molding material
M2 Resin

The invention claimed is:

1. A seat pad comprising a surface portion up to 10 mm from a surface,
wherein
an air permeability of the surface portion is measured in compliance with JIS K 6400-4:2004, the air permeability is more than 5 cc/cm$^2$/sec and at or less than 25 cc/cm$^2$/sec,
the seat pad further comprises a cushion pad,
a seat portion of the cushion pad is partitioned into an under-buttocks portion and an under-knees portion,
the air permeability of the surface portion of the under-buttocks portion on a seat side is within a range of more than 5 cc/cm$^2$/sec and at or less than 25 cc/cm$^2$/sec, when the air permeability is measured in compliance with JIS K 6400-4:2004, and
the air permeability of the surface portion of the under-knees portion is greater than the air permeability of the surface portion of the under-buttocks portion.

2. The seat pad according to claim 1,
wherein when a core portion inside the surface portion is cut out and an air permeability of the core portion is measured in compliance with JIS K 6400-4:2004, the air permeability of the core portion is greater than the air permeability of the surface portion.

3. The seat pad according to claim 1, further comprising a groove configured to partition an air permeability limited portion having the surface portion the air permeability of which is limited to within a range of more than 5 cc/cm$^2$/sec and at or less than 25 cc/cm$^2$/sec, when the air permeability is measured in compliance with JIS K 6400-4:2004, from another portion adjacent to the air permeability limited portion,
wherein the surface portion of the air permeability limited portion includes a surface portion of a side face of the groove connected to the air permeability limited portion.

4. A seat pad comprising a surface portion up to 10 mm from a surface,
wherein an air permeability of the surface portion is measured in compliance with JIS K 6400-4:2004, the air permeability is more than 5 cc/cm$^2$/sec and at or less than 25 cc/cm$^2$/sec,
the seat pad further comprises a groove configured to partition an air permeability limited portion having the surface portion the air permeability of which is limited to within a range of more than 5 cc/cm$^2$/sec and at or less than 25 cc/cm$^2$/sec, when the air permeability is measured in compliance with JIS K 6400-4:2004, from another portion adjacent to the air permeability limited portion, and the surface portion of the air permeability limited portion includes a surface portion of a side face of the groove connected to the air permeability limited portion.

5. The seat pad according to claim 4,
wherein when a core portion inside the surface portion is cut out and an air permeability of the core portion is measured in compliance with JIS K 6400-4:2004, the air permeability of the core portion is greater than the air permeability of the surface portion.

6. The seat pad according to claim 4,
wherein the air permeability of an entirety of the surface portion of the cushion pad on a seat side is limited to within a range of more than 5 cc/cm$^2$/sec and at or less than 25 cc/cm$^2$/sec, when the air permeability is measured in compliance with JIS K 6400-4:2004.

7. A seat pad manufacturing method for obtaining a seat pad comprising a surface portion up to 10 mm from a surface, the seat pad manufacturing method comprising supplying a molding material into a molding die and performing foam molding,
wherein an air permeability of the surface portion is measured in compliance with JIS K 6400-4:2004, the air permeability measurement is more than 5 cc/cm$^2$/sec and at or less than 25 cc/cm$^2$/sec,
an inner surface of the molding die is covered with polystyrene or polyethylene is used,
the molding die includes a protrusion configured to partition an inner surface of the molding die covered with polystyrene or polyethylene, and
a side face of the protrusion is covered with polystyrene or polyethylene.

* * * * *